(12) United States Patent
Hall et al.

(10) Patent No.: US 6,227,246 B1
(45) Date of Patent: May 8, 2001

(54) FAUCET MIXING VALVE HOUSING WITH CHECK VALVES AND FILTER

(75) Inventors: David C. Hall, Wheaton; Martin E. Marcichow, Hoffman Estates, both of IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 09/549,731

(22) Filed: Apr. 14, 2000

(51) Int. Cl.[7] .................................................. F16K 31/58
(52) U.S. Cl. .................. 137/625.41; 137/549; 137/614.2
(58) Field of Search .............................. 137/549, 625.41, 137/614.2

(56) References Cited

U.S. PATENT DOCUMENTS

| | | | |
|---|---|---|---|
| 3,782,417 | * | 1/1974 | Moen ............................... 137/625.17 |
| 3,941,152 | * | 3/1976 | Botnick ............................ 137/625.26 |
| 4,669,653 | * | 6/1987 | Avelov ............................... 236/12.13 |
| 4,854,347 | * | 8/1989 | Knapp ............................... 137/625.4 |
| 4,957,137 | * | 9/1990 | Wang .................................. 137/549 |
| 5,329,958 | * | 7/1994 | Bosio .................................. 137/269 |

* cited by examiner

Primary Examiner—John Fox
(74) Attorney, Agent, or Firm—Cook, Alex, McFarron, Manzo, Cummings & Mehler, Ltd.

(57) ABSTRACT

An electronically-controlled faucet has a hot-cold water mixing valve disposed in a cup-shaped housing with an open end of the housing accessible from the top side of a deck to which the housing is mounted. Water supply and discharge lines are connectable to the housing. A spacer between the closed end of the housing and the mixing valve supports check valves that prevent cross flow and reverse flow. The spacer also supports a filter screen located downstream of the mixing valve. The filter screen has a wetted area greater than the cross sectional area of the water supply lines and ports. A removable cap covers the housing. All of the mixing valve, check valve and filter components are accessible from above the deck without disconnecting any of the water lines.

16 Claims, 5 Drawing Sheets

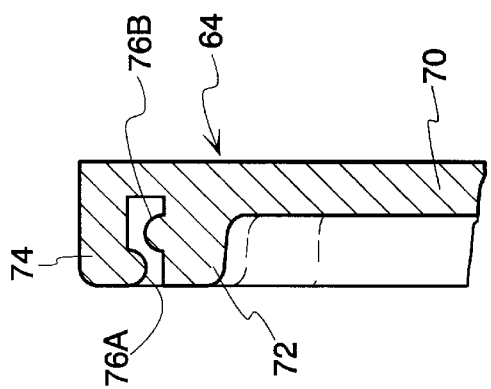
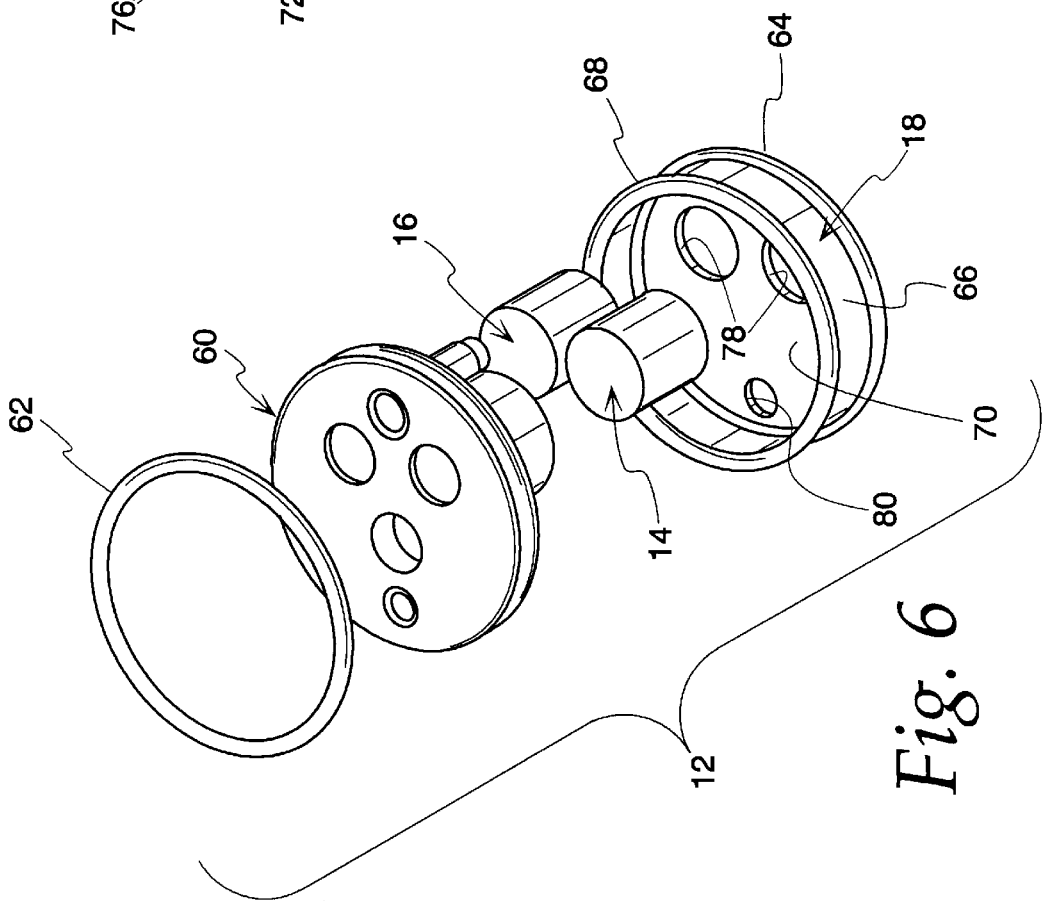
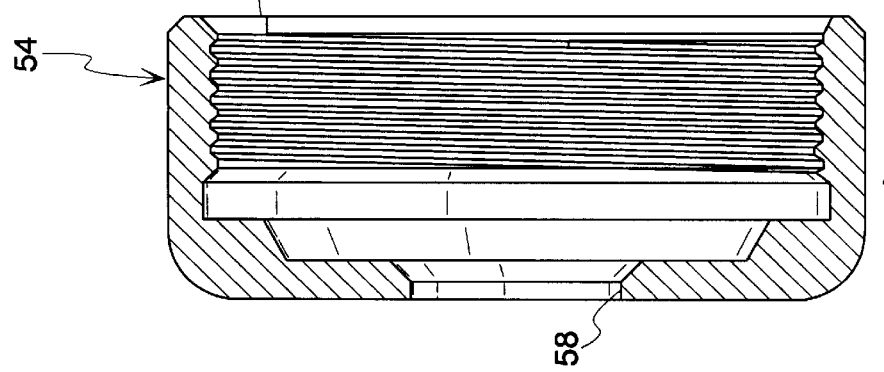

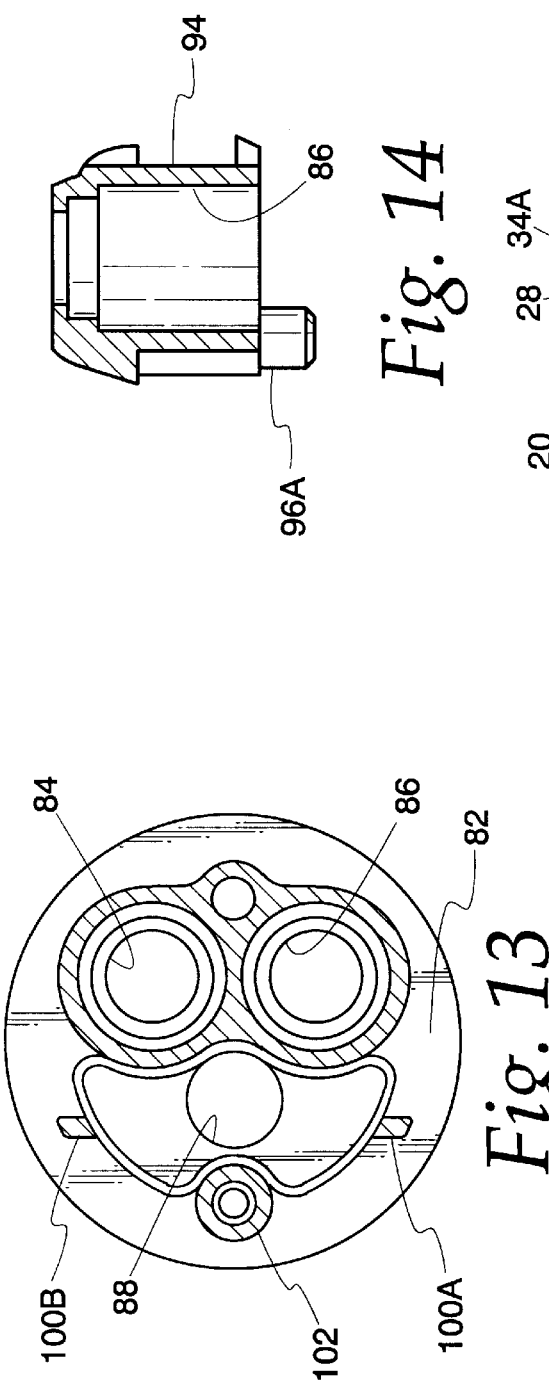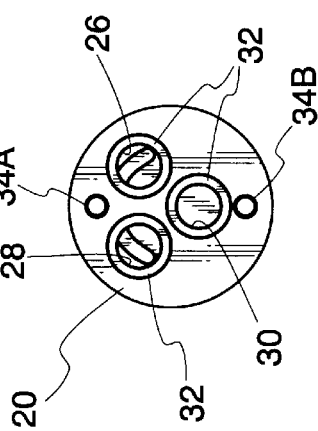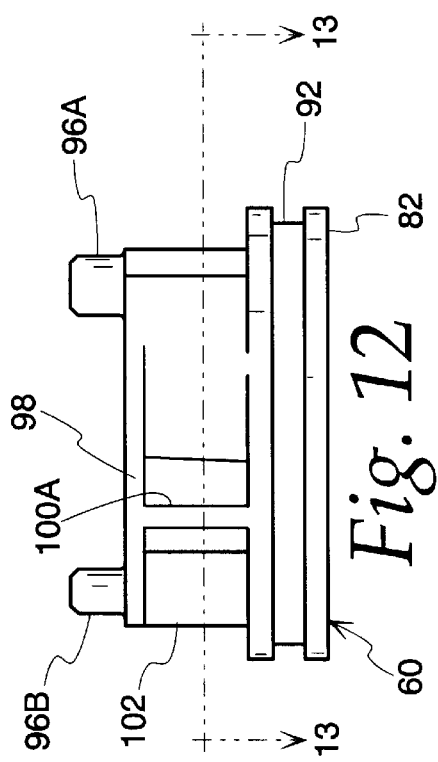
Fig. 14
Fig. 15
Fig. 13
Fig. 12

US 6,227,246 B1

FAUCET MIXING VALVE HOUSING WITH CHECK VALVES AND FILTER

BACKGROUND OF THE INVENTION

This invention relates to faucets and is particularly concerned with electronically-controlled faucets having a cartridge-type mixing valve for setting water temperature mounted in a housing. Hot and cold water is supplied to the mixing valve. A discharge line extends from the housing to the spout. A user sets the mixing valve, through either mechanical or electronic actuators, to obtain a desired water temperature. Typically a solenoid-actuated pilot valve in the discharge line turns the water flow on and off. Proximity sensors control the pilot valve.

The pilot valves used in faucets of the type described are somewhat intolerant of foreign matter in the water. Accordingly, it is common to use a filter or screen to remove foreign particles upstream of the pilot valve. Preferably filtering would be done immediately before water enters the pilot valve but this is not a convenient location in terms of installing and servicing the filter. For purposes of aesthetics and mechanical protection, the pilot valve is always located beneath or behind a faucet housing, wall, sink or the like. Thus, if the filter is located adjacent the pilot valve, the filter is relatively inaccessible and certainly inconvenient for routine maintenance. But placing the filter remote from the pilot valve limits the effectiveness of the filtering.

The useful life of known filters has been limited by their cross-sectional area. Filters are provided in the water lines and therefore they are restricted by the cross-sectional area of the line. This means the filters are subject to clogging, which either restricts flow or reduces the filter's effectiveness at removing impurities.

Another problem with this type of faucet is the need to prevent cross flow between the hot and cold water lines. Check valves (also known as back checks) in the hot and cold water lines can prevent cross flow but again the mounting of such devices poses a problem. Placing the check valves in the supply lines themselves means the lines have to be disconnected for servicing or replacement. This increases the potential for leaks once the check valves have been serviced or replaced

SUMMARY OF THE INVENTION

The present invention concerns a faucet that has an improved mounting arrangement for a mixing valve. The mounting arrangement includes a housing having a generally hollow, cup-shaped body that is connectable to the faucet body or deck. The housing has a closed end toward the hidden side of the deck and an open end toward the exposed side of the deck. A spacer assembly has check valves and a filter sub-assembly attached thereto. The spacer assembly and a mixing valve cartridge are mounted in the housing. Each of these components is insertable and removable through the open end of the housing from the exposed side of the deck.

The housing body has first and second inlet ports connectable to hot and cold water supply lines. The body also has an outlet port for mixed water connectable to a discharge line. The discharge line incorporates a pilot valve therein and extends to the faucet's spout. The mixing valve has first and second inlet apertures for receiving hot and cold water. The mixing valve also has an outlet aperture for dispensing mixed water of the desired temperature. Passages in the spacer provide fluid communication between the first inlet port and first inlet aperture, between the second inlet port and second inlet aperture and between the outlet aperture and outlet port. A filter screen surrounds the spacer between the outlet aperture and the outlet port. Thus, the filter is located downstream of the mixing valve and as close as possible to the pilot valve without putting it in the discharge line. Check valves are located in the spacer passages between the inlet ports of the housing and the inlet apertures of the mixing valve. Both the check valves and the filter are accessible from the open side of the housing and the exposed side of the deck.

The filter screen extends circumferentially about the spacer. Water flowing out of the mixing valve get dumped axially into the center of the filter screen and passes radially through the screen on its way to the outlet port of the housing body. This maximizes the filter area and decreases the amount of maintenance required on the filter.

BRIEF DESCRIPTION OF THE DRAWINGS

FIG. 5 is a section through the cap.

FIG. 6 is an exploded perspective view of the spacer assembly.

FIG. 7 is an enlarged detail view of a portion of the lower gasket.

FIG. 12 is a second side elevation view of the spacer.

FIG. 13 is a section taken along line 13—13 of FIG. 12.

FIG. 14 is a partial section taken along line 14—14 of FIG. 10.

FIG. 15 is a bottom plan view of the mixing valve cartridge.

DETAILED DESCRIPTION OF THE INVENTION

Figure 1:
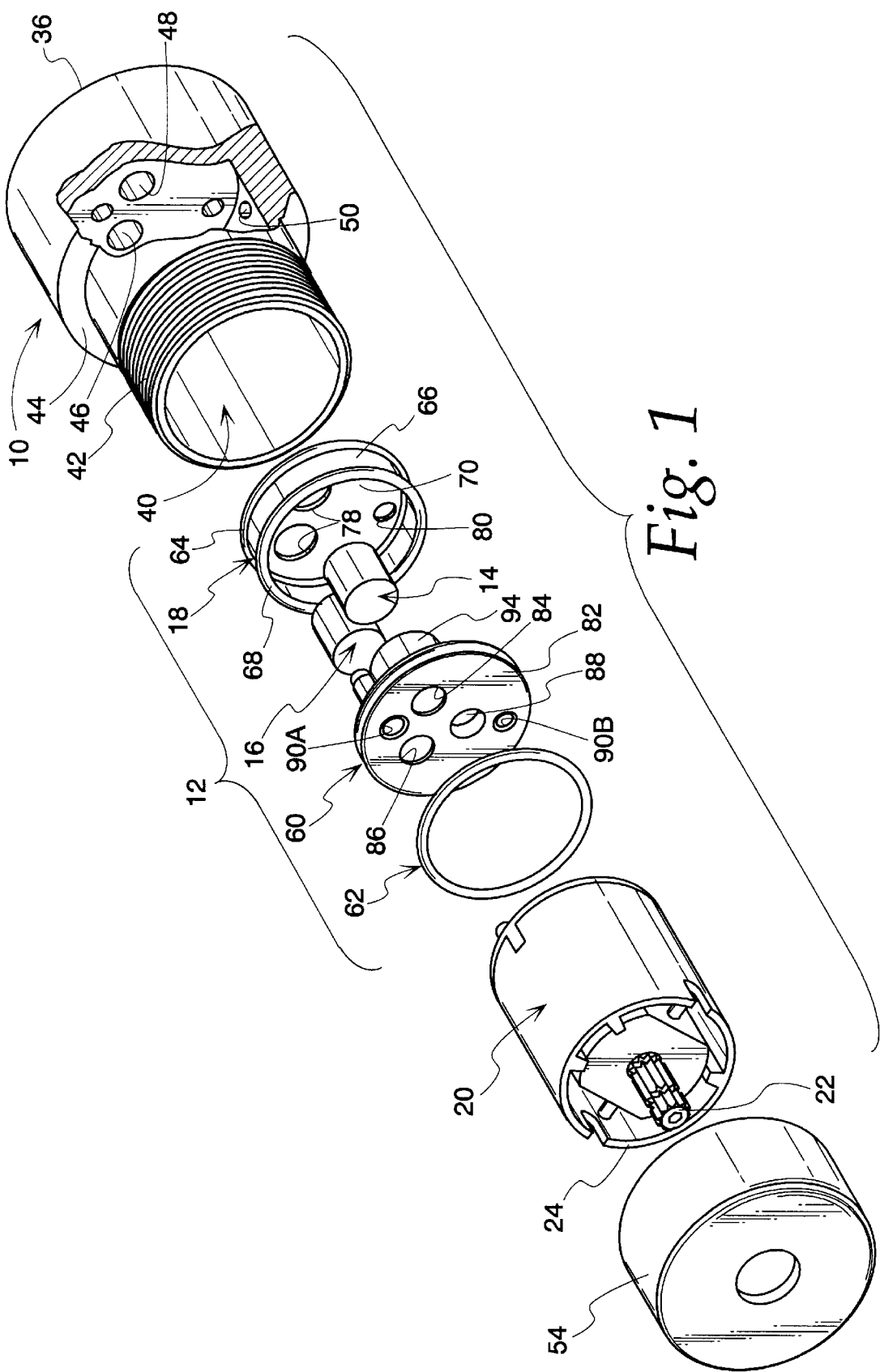
FIG. 1 is an exploded perspective view of the present invention with portions cut away.

The present invention relates to a faucet and in particular to an apparatus for mounting the mixing valve cartridge of a faucet. FIG. 1 illustrates an exploded assembly of this apparatus. Components of the assembly include a housing 10, a spacer assembly 12 which includes first and second check valves 14 and 16, a filter sub-assembly 18 and a mixing valve cartridge 20. The mixing valve cartridge illustrated is a conventional ceramic disk type, although it could be otherwise. The valve cartridge includes a stem 22 which is connectable to a suitable handle or actuating mechanism (not shown). The stem 22 is rotatable within a sleeve 24 for the purpose of mixing hot and cold water in proportions designated by the user of the faucet. FIG. 15 shows a bottom plan view of the cartridge. The cartridge has first and second inlet apertures 26 and 28 and an outlet aperture 30 (FIG. 15). These are surrounded by suitable gaskets as show n at 32. Hot and cold water flows into the cartridge through the inlet apertures 26 and 28 respectively. Mixed water flows out the outlet aperture 30. The bottom of the cartridge also has protruding pegs or lugs 34A, 34B for the purpose of locating or orienting the cartridge within the housing 10 as will be described below. One of the lugs is larger than the other to ensure proper orientation.

Figure 4:
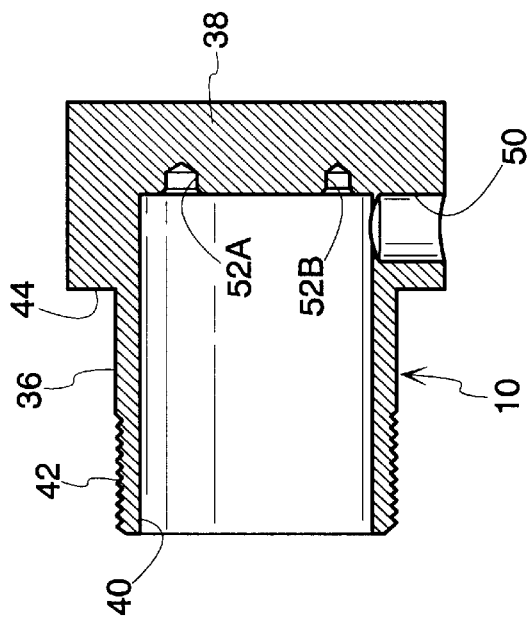
FIG. 4 is a section taken along line 4—4 of FIG. 2.
Figure 2:
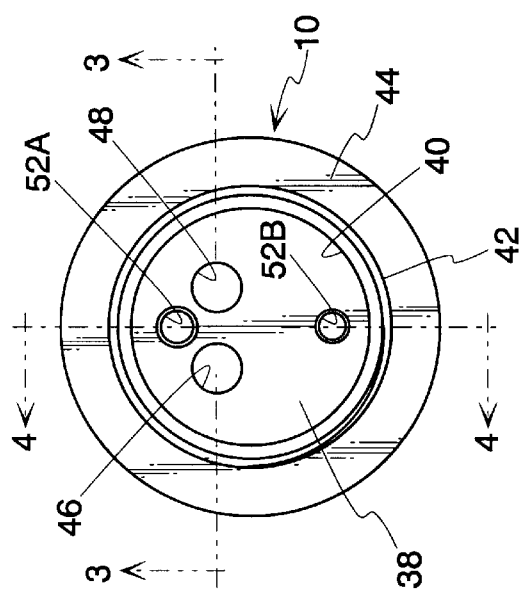
FIG. 2 is a plan view of the housing.
Figure 3:
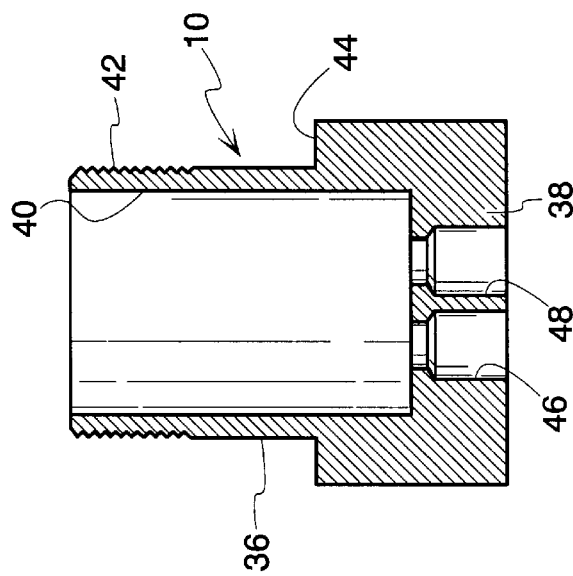
FIG. 3 is a section taken along line 3—3 of FIG. 2.

Details of the housing 10 are shown in FIGS. 2–4. The housing is a generally cup-shaped member having a body 36 with a closed end 38 and an open end 40. The exterior body surface near the open end may have threads as at 42 for mounting a housing cap 54. Midway between the closed end 38 and open end 40 is a shoulder 44 which may be used for locating the housing 10 on the underside of a faucet housing, sink, counter top, wall or related surface on which the faucet is mounted. These will be referred collectively herein as a deck. The deck, in whatever form it takes, normally has an opening aligned with the open end 40. The deck opening typically has a removable, decorative cover over it when the faucet installation is complete. Thus, the upper end of the housing 10 may fit into or through an opening in the deck while the shoulder 44 engages the underside or hidden side of the deck. Screws or the like may be used to fasten the housing 10 to the deck. With this arrangement, the open end 40 faces toward the side of the deck which is exposed to the user while the closed end 38 faces the hidden or underside of the deck. This means the open end 40 is accessible from the top or exposed side of the deck when the deck cover is removed.

The closed end 38 of the housing has first and second inlet ports 46 and 48 extending therethrough. These ports are connectable to hot and cold water supply lines by suitable connecting methods. The side wall of the housing body has an outlet aperture 50 (FIG. 4) extending through it. The outlet aperture is connectable to the faucet's discharge line (not shown). The remaining feature of the housing body 36 is a pair of sockets 52A, 52B. The sockets extend partially through the thickness of the closed end 38. Socket 52A is slightly larger in diameter than socket 52B for purposes of orientation.

FIG. 5 illustrates a cap 54 which is used to substantially close off the open end 40 of the housing body 36 once all of the components have been installed inside the housing. The cap has internal threads 56 which mesh with threads 42 of the housing 10. A central opening 58 permits access to the valve stem 22.

FIG. 6 shows the components of the spacer assembly 12. These include the spacer element shown generally at 60 which receives the check valves 14 and 16. The check valves are preferably spring loaded and fit snugly in pockets formed in the spacer element. They are commercially available from Neoperl. The spacer element further includes an O-ring 62 that fits in a groove in the spacer element. Surrounding much of the spacer element is the filter sub-assembly 18. The filter sub-assembly includes a lower gasket 64, a cylindrical screen 66 and an upper gasket 68.

Details of the lower gasket 64 are shown in FIG. 7. The lower gasket has a generally circular plate 70 bounded by a flange formed by inner and outer ribs 72 and 74. The ribs are spaced apart to define a slot between them. Each rib has an inwardly facing bead 76A, 76B extending into the slot. Together the ribs and their beads provide a retention member for an edge of the cylindrical screen 66. That is, the screen is pressed down into the slot between the ribs with the beads 76 engaging the screen to hold it on the lower gasket. The lower gasket plate 70 also has openings 78 located so as to align with the inlet ports 46 and 48. The plate 70 further includes openings 80 to permit passage of the locating pins of the spacer element, as will be described below. The lower gasket is made of a suitable elastomeric material.

The construction of the upper gasket 68 is similar to the lower gasket 64 except that the upper gasket does not have the central plate 70. It simply has an annular flange with a similar rib and bead configuration for mounting to the other edge of the cylindrical screen. The upper gasket is made of a suitable elastomeric material. The cylindrical screen is made of stainless steel such as Type 316 and has a suitable hole size such as 0.007 inches.

Figure 10:
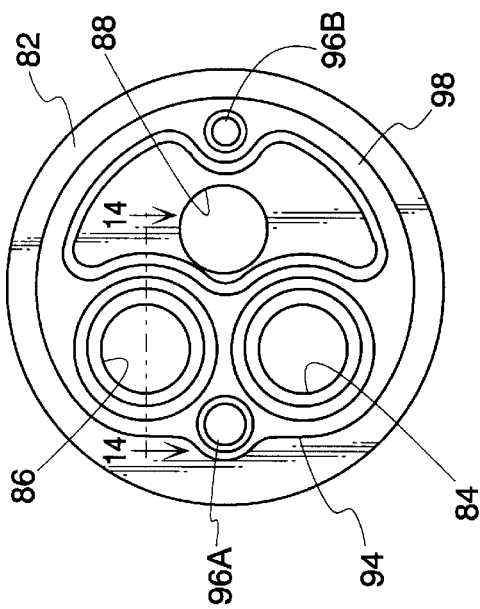
FIG. 10 is a bottom plan view of the spacer.
Figure 9:
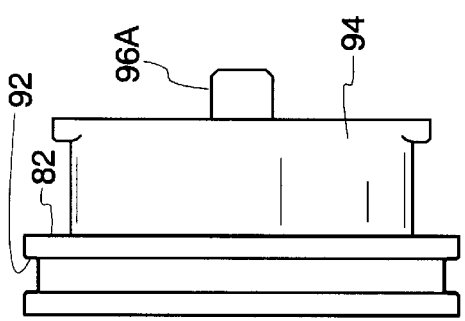
FIG. 9 is a first side elevation view of the spacer.
Figure 8:
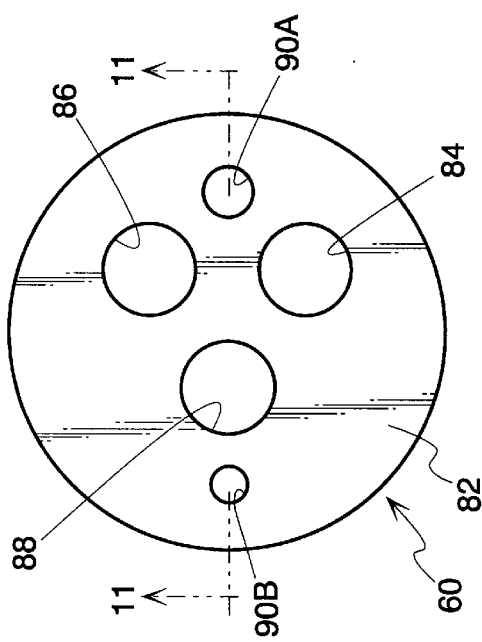
FIG. 8 is a top plan view of the spacer.
Figure 11:
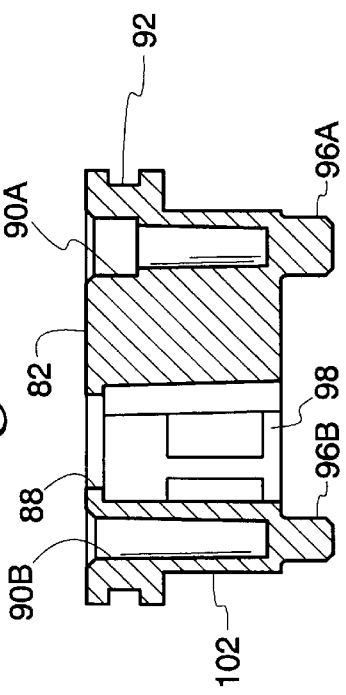
FIG. 11 is a section taken along line 11—11 of FIG. 8.

Tuning now to FIGS. 8–14, details of the spacer element 60 are shown. Beginning in FIG. 8, the spacer element has a flat, circular base 82 with first and second inlet passages 84 and 86 extending therethrough. An outlet passage 88. is adjacent the two inlet passages. Sockets 90A and 90B are also visible on the top side of the base 82. Turning to FIG. 9, it can be seen that the edge of the base 82 has a groove 92 for receiving the O-ring 62. Extending downwardly from the base 82 is a casing 94. A peg 96A extends from one side of the casing. As seen in FIGS. 10 and 13, the casing 94 has a cross section somewhat reminiscent of the cross section of a shotgun barrel. Indeed, the first and second inlet passages 84 and 86 extend fully through the casing. The peg 96A extends upwardly from about the middle of the casing on one side thereof. A semi-circular hoop or wall 98 extends from the bottom edge of the casing generally around the periphery of the base 82. As seen in FIGS. 11 and 12, the hoop 98 is supported by a pair of braces 100A, 100B and a post 102. The bottom of the post 102 extends to a peg 96B. The spacer may be made of an acetyl copolymer such as Celcon.

Assembly of the mixing valve is as follows. First the filter sub-assembly 18 is prepared as described above by pressing the upper and lower gaskets 68 and 64 onto the edges of the filter screen 66. Then the check valves 14 and 16 are inserted into the first and second inlet passages 84, 86 of the casing 94. The O-ring 62 is placed in the groove 92 and the filter sub-assembly is placed around the casing 94 and hoop 98 of the spacer element 60. The pegs 96A, 96B extend through the openings 80 in the lower gasket. At the same time the check valves 14, 16 are aligned with the openings 78 in the lower gasket. The completed spacer assembly is then placed through the open end 40 of the housing body 36 with the base 82 facing up or outwardly and the pegs 96A, 96B facing the closed end 38 of the housing. The spacer assembly is oriented so the pegs 96 align with the sockets 52. As mentioned above, the pegs and sockets have different sizes so that they can only engage one another in one single, correct orientation. The spacer assembly is pressed down so the lower gasket 64 contacts the closed end of the housing, sealing against the inlet apertures. The O-ring 62 at that point seals against the side walls of the housing body at a point above the outlet aperture 50. Thus, there is an outlet chamber defined by the base 82 and O-ring 62, the closed end 38 and the body's side walls. The casing 94 provides water-tight inlet passages that go through the outlet chamber without allowing any mixing between incoming and outgoing water.

Once the spacer assembly is in place, the mixing valve cartridge 20 is placed through the open end of the housing and into engagement with the upper surface of the base 82 of the spacer assembly 12. The lugs 34A, 34B on the bottom of the mixing valve cartridge engage the sockets 90A, 90B in the base 82. Once again, variably sized lugs and sockets assure correct orientation. In this orientation, the first and second inlet apertures 26, 28 of the mixing valve cartridge are aligned with the first and second inlet passages 84, 86 of the spacer assembly. Similarly, the outlet port 30 is aligned with outlet passage 88. Gaskets 32 seal each of these junctions. The cap 54 is screwed onto the housing body 36 to complete the unit. The housing 10 then is mounted in an opening in the deck and retained by screws. A handle or other actuator is attached to the valve stem 22. Hot and cold water lines (not shown) are connected to the first and second inlet ports 46 and 48. A water discharge line is attached to the outlet aperture 30. The final step is to place the decorative cover over the deck opening.

Water flow through the device is as follows. When the pilot valve is open, hot and cold water from the supply lines enters the housing through the inlet ports 46 and 48. Water immediately passes through the openings 78 in the lower gasket's plate 70 and into the first and second inlet passages 84, 86, in the process passing through the check valves 14 and 16. The water then flows into the valve cartridge 20 through apertures 26, 28. Inside the cartridge water is mixed according to the setting chosen by a user. Water flows out of the cartridge through the outlet aperture 30 of the cartridge. The outgoing water flows through the seal on the cartridge and through the outlet passage 88 into the outlet chamber. From there, the water flows out past the braces 100A, 100B and the post 102 and through the cylindrical screen 66 to the outlet aperture 50 of the housing 10. Once water enters the outlet aperture, it goes to the discharge line and the solenoid valve and from there to the faucet spout.

It can be seen that this arrangement greatly enlarges the outlet passage with a corresponding increase in the filter area. The wetted surface of the filter is many times larger than the cross sectional area of the discharge line. In fact, in this embodiment the filter is a complete cylinder. This enlarged filter surface area reduces the tendency of the filter to clog, thereby increasing its service life and decreasing the need for maintenance. It is also evident that when service does become necessary it can be done from the exposed side of the deck by removing the decorative cover, if any, and the cap 54. The valve cartridge then lifts out, as does the spacer assembly with its filter subassembly and check valves. All this work can be done from above the deck without disconnecting any water lines from the housing body. Maintenance becomes much easier to perform with the attendant benefits that it will be done on time and performed correctly.

While a preferred form of the invention has been shown and described, it will be realized that alterations and modifications may be made thereto without departing from the scope of the following claims.

What is claimed is:

1. In a faucet of the type having a deck with exposed and hidden sides and an opening extending from the hidden to the exposed side, a spout connected to the deck with a discharge line supplying water to the spout and a pilot valve in the discharge line, the improvement comprising:

a generally hollow housing connectable to the deck, the housing having a closed end and an open end facing toward and accessible from the exposed side of the deck, the housing having an outlet port connectable to the discharge line and first and second water inlet ports connectable to hot and cold water supply lines, respectively;

a mixing valve in the housing having first and second inlet apertures and an outlet aperture, the mixing valve being sized for installation into and removal from the housing through the open end; and a filter in the housing between the outlet aperture and the outlet port, the filter being sized for installation into and removal from the housing through the open end.

2. The faucet of claim 1 further comprising a spacer assembly disposed in the housing between the closed end and the mixing valve, the spacer assembly being sized for installation into and removal from the housing through the open end, the spacer assembly defining:

an outlet passage providing fluid communication between the outlet aperture of the mixing valve and the outlet port of the housing, and first and second inlet passages providing fluid communication between said first inlet port and said first inlet aperture and between said second inlet port and said second inlet aperture, respectively.

3. The faucet of claim 2 further comprising first and second check valves disposed in the first and second inlet passages.

4. The faucet of claim 2 wherein the filter at least partially surrounds said spacer.

5. The faucet of claim 2 wherein the spacer assembly further comprises a lower gasket disposed adjacent the closed end of the housing in sealing engagement with the inlet and outlet ports of the housing.

6. The faucet of claim 1 further comprising a housing cap removably connectable to the housing at or near the open end.

7. The faucet of claim 1 further characterized in that the flow area of the filter is greater than the cross-sectional area of the outlet port.

8. The faucet of claim 1 further comprising a spacer assembly disposed in the housing between the closed end and the mixing valve, the spacer assembly being sized for installation into and removal from the housing through the open end, the spacer assembly defining an outlet passage providing fluid communication between the outlet aperture of the mixing valve and the outlet port of the housing.

9. The faucet of claim 8 wherein the spacer assembly comprises a circular base sealingly engaging the housing body between the outlet aperture and the mixing valve to define an outlet chamber between the base and the closed end of the housing, the outlet passage extending through the base to provide fluid communication to the outlet chamber.

10. The faucet of claim 9 wherein the filter is disposed in the outlet chamber between the outlet passage and the outlet port.

11. The faucet of claim 10 further characterized in that the filter at least partially surrounds the outlet passage such that water flow from the outlet passage to the outlet port must go through the filter.

12. A faucet, comprising a cup-shaped housing mountable on a deck with an open end of the housing accessible from one side of the deck, inlet and outlet ports formed in the housing and connectable to water supply and delivery lines, a water flow control valve in the housing, check valves in the housing and arranged to prevent reverse flow of water and a water filter in the housing between the control valve and the outlet port to filter water coming out of the control valve before it leaves the housing.

13. The faucet of claim 12 further comprising a spacer assembly between the control valve and the closed end of the housing, the check valves being supported in the spacer assembly.

14. The faucet of claim 13 wherein the water filter at least partially surrounds the spacer assembly.

15. A faucet, comprising a housing having an axis and mountable on a deck, inlet and outlet ports formed in the housing and connectable to water supply and delivery lines, a water flow control valve in the housing, the housing and control valve defining an outlet chamber into which water flows axially from the control valve, a water filter in the outlet chamber between the control valve and the outlet port to filter water coming out of the control valve before it leaves the housing.

16. The faucet of claim 15 wherein the water filter has a wetted area greater than the cross sectional area of any one of the water supply and delivery lines or the water inlet and outlet ports.

* * * * *